3,597,401
Patented Aug. 3, 1971

3,597,401
LACTAM POLYMERIZATION WITH THIOLACTONE INITIATORS
James E. McGrath, Somerville, and Markus Matzner, Edison, N.J., assignors to Union Carbide Corporation, New York, N.Y.
No Drawing. Filed Dec. 8, 1969, Ser. No. 883,359
Int. Cl. C08g 20/18
U.S. Cl. 260—78                                                10 Claims

ABSTRACT OF THE DISCLOSURE

Thiolactones are utilized as polymerization initiators or activators with alkaline catalysts in the anionic polymerization of lactam monomers so as to provide for a rapid polymerization process. The polymers thus obtained have good physical properties and good color.

BACKGROUND OF THE INVENTION

Field of the invention

The invention relates to the anionic polymerization of lactam monomers.

Description of the prior art

In the anionic polymerization of lactams there is usually employed a catalyst-initiator system. The catalyst is commonly a material which will form an alkali or alkaline earth metal salt of the lactam. The initiators or activators that have been used to date have included a number of materials such as various lactones as disclosed, for example, in British Pat. 1,098,093.

These prior art catalyst-initiator systems, however, provide for a relatively slow rate of polymerization. These systems, because of their relatively slow rates of polymerization, are not too readily adaptable for use in various types of molding equipment that might be employed on a high speed production line wherein the polymerization reaction is conducted in situ, which technique is commonly employed today in the commercial molding of anionically produced lactam polymers.

SUMMARY OF THE INVENTION

Lactams are anionically polymerized utilizing a catalyst-initiator system whereby the lactams can be polymerized in a relatively short period of time. This system contains an anionic catalyst and, as the initiator or activator, one or more thiolactone compounds.

An object of the present invention is to provide an anionic polymerization process whereby lactams may be readily polymerized in a relatively fast period of time to provide high molecular weight polymers.

Another object of the present invention is to provide a novel initiator or activator system for use in the anionic polymerization of lactam monomers.

DESCRIPTION OF THE PREFERRED EMBODIMENT

It has now been found that lactams may be polymerized anionically in a relatively fast period of time if there is employed as the catalyst-initiator system for such polymerization, an anionic catalyst and, as an initiator or activator, one or more thiolactone compounds.

The lactams

The lactams which may be polymerized according to the present invention are all those which are capable of being polymerized anionically, and are preferably those lactam monomers which contain at least one ring group of the structure

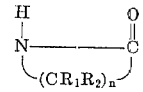

wherein $n$ is a whole number which is 3 to 15, and preferably 3 to 10, and $R_1$ and $R_2$ may be the same or different radicals on each carbon atom and may be H or $C_1$ to $C_{10}$ hydrocarbon.

Such lactams would include those having a single ring structure such as 2-pyrrolidone, 2-piperidone, 6-methyl-2-piperidone, $\epsilon$-caprolactam, enantholactam, capryllactam, lauryllactam, decanolactam, undecanolactam, dodecanolactam, pentadecanolactam, hexadecanolactam, alkyl substituted caprolactams, aryl substituted lactams, and the like.

Lactams having a plurality of ring structures which may be used in the present invention include bis-lactams such as alkylene bis lactams of the formula:

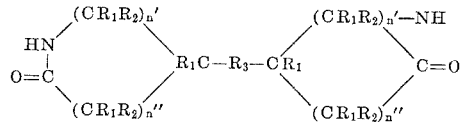

wherein $n'$ and $n''$ are each whole numbers such that $n'$ and $n''$ is 2 to 14; $R_1$ and $R_2$ are as defined above; and $R_3$ may be $C_1$ to $C_4$ alkylene such as methylene, ethylene, propylene and butylene; phenylene and substituted phenylene; O and S.

Other lactams having a plurality of ring structures include bicyclic lactams, such as those represented by the formulae:

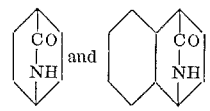

The lactams to be polymerized can be used individually or in any combination thereof.

The initiator

The thiolactone initiators which can be used in the process of the present invention have the structure

wherein R is a $C_3$ to $C_{20}$ hydrocarbon, oxyhydrocarbon or thiahydrocarbon radical. The preferred initiators are those in which R is

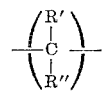

wherein $n$ is a whole number of about 3 to 8, and R' and R'' may be the same or different and may be H or a $C_1$ to $C_{20}$ saturated or unsaturated aliphatic, alicyclic or aromatic hydrocarbon radical, such as alkyl, alkaryl, aralkyl, aryl or alkylene radical, where it is alkylene, R' and R'' will join to form a ring. Examples of such initiators are thio-$\epsilon$-caprolactone, thio-$\gamma$-butyrolactone, thio-$\delta$-valerolactone, thio-$\gamma$-valerolactone, thio-$\gamma$-caprolactone, thiolaurolactone, thio-$\delta$-caprolactone and the like. The thiolactone initiators may be used individually, or in combination with one or more other thiolactones or other initiators. About 0.001 to 10 moles of initiator are employed per 100 moles of lactam monomer being polymerized.

The polymers

The use of the initiators of the present invention results in the preparation of polymers by the following two step process:

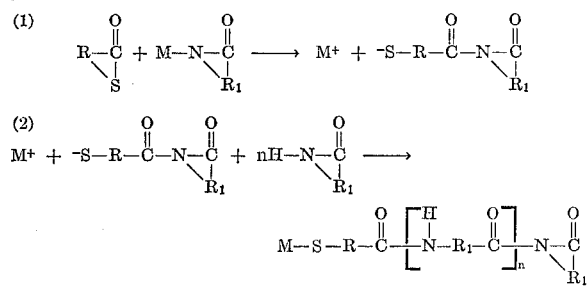

wherein

R is as defined above,

M is the cation of the anionic catalyst, $R_1$ is that portion of the structure of the lactam being polymerized which lies between the nitrogen atom and the carbonyl carbon atom of such lactam, and $n$ is a whole number which is $>1$ and is such that the polymer is a material that is normally solid, i.e., solid at temperatures of about 25° C., and has a reduced viscosity in m-cresol (0.1 gram/100 ml.) at 25° C. of $\geq 0.4$, and preferably about 0.8 to 7, deciliters/grams.

The value of $n$ may vary somewhat in each polymerized lactam chain, and will be about 10 to about 5000. The polymers would thus have molecular weights of about 1000 to 500,000 or more.

The lactam polymers prepared with the thiolactone initiators of the present invention have good color and physical properties. The cast polymers have particularly good high heat distortion temperatures, of the order of $\geq 100°$ C. (264 p.s.i.).

The catalyst

The catalysts which may be employed in the anionic polymerization reaction of the present invention include all anionic catalyst materials which may be employed in the anionic polymerization of lactams. The catalyst material is usually a salt of the lactam being polymerized although any other lactam may be used to form the catalyst. The salt is usually prepared by reacting the lactam with a strong base, i.e., a base strong enough to convert the lactam to its salt. Such bases would include alkali and alkaline earth metals or basic derivatives of such metals such as the hydroxides, oxides, alkoxides, phenoxides, hydrides, alkyls, aryls, amides, borohydrides and weak acid salts, i.e., acetates, carbonates, bicarbonates, benzoates, sulfites and bisulfites; Grignard reagents, and various other organo-metallic compounds. Such bases would include, therefore, metals such as lithium, sodium, potassium, magnesium, calcium, strontium, barium, and aluminum and derivatives of such metals, such as lithium hydroxide, sodium hydroxide, potassium hydroxide, magnesium hydroxide, calcium hydroxide, strontium hydroxide, barium hydroxide, lithium hydride, sodium hydride, sodium oxide, sodium methoxide, sodium phenoxide, sodium methyl, sodium ethyl, sodium phenyl, sodium naphthyl, and sodamide; Grignard reagents such as ethyl magnesium chloride, methyl magnesium bromide, and phenyl magnesium bromide; and other compounds such as zinc diethyl, triisopropyl aluminum, diisobutyl aluminum hydride, and lithium aluminum hydride.

About 0.2 to 20, and preferably 0.5 to 6 mole percent of catalyst is used per mole of monomer being polymerized.

The catalyst and initiator are employed in a mole ratio to each other of about 2 to 20, and preferably, 3 to 12.

When the strong base is reacted with the lactam to form the catalyst a by-product is usually formed. For example, hydrogen is formed as a by-product when the metal hydrides or the elemental metals are used; water is formed as a by-product when metal hydroxides are used; alcohols are formed when alkoxides are used and water and $CO_2$ are formed when carbonate or bicarbonate salts are used. The preferred catalysts are those which result in the most readily removable by-products, since some of the by-products, such as $H_2O$, may have a deleterious effect on the polymerization reaction.

The polymerization process

The polymerization reaction is preferably conducted in bulk. Under such bulk polymerization procedures the monomer, catalyst and initiator are charged in the desired proportions to the reactor. The bulk polymerization reaction is usually conducted at atmospheric pressure and at a temperature of about 100 to 250° C. The reaction can be conducted at a temperature which is above or below the melting point of the resulting polymer, and above that of the monomer. The use of elevated pressure is not required for the polymerization reaction. The bulk polymerization reaction requires a polymerization period of about 3 to 15 minutes at 100°–250° C. depending on the lactam(s) employed, and the polymerization temperature. The bulk polymerization reaction should be carried out under anhydrous conditions, i.e., in the presence of no more than about 0.3 weight percent, and preferably no more than 0.03 weight percent, of water or other active hydrogen containing by-product. Where a catalyst is used which would generate water or other active hydrogen containing by-products, such as the hydroxide, alkoxide or phenoxide catalysts, the excess amounts of such by-product materials should be removed from the polymerization reaction is conducted.

The polymerization is preferably carried out under an inert blanket of gas, such as, nitrogen, argon or helium in order to prevent oxidative degradation of the monomer and destruction of the catalyst by moisture.

The reaction may be carried out batchwise or continuously. An advantageous method of carrying out the reaction of the present invention is to conduct the bulk polymerization in conventional molding equipment such as a rotational casting device or a compression molding machine, or an extruder. In this way the polymer and the molded objects can both be formed in one step. Where the polymerization is conducted in such molding devices, conventional molding pressures may be employed in order to simultaneously form the molded object with the in situ formed polymer.

Since the lactams are normally solid materials at room temperatures, the bulk polymerization reactions may be carried out by various procedures. In one procedure, the lactam may be melted, and both the catalyst and the initiator admixed with it and then the reaction may be caused to proceed by bringing the reaction mixture to polymerization temperatures.

In another procedure, the catalyst and initiator may be dissolved separately in the lactam monomer, after which the two separate solutions may be combined to cause the polymerization to proceed at polymerization temperatures. Where the polymerization is conducted in molding equipment, the equipment may be heated to the desired polymerization temperature in order to effect polymerization upon injection therein of the polymerization reaction system.

In addition to being conducted in bulk, the polymerization may also be conducted in high boiling inert organic solvents, i.e., those having boiling points of above 100° C., such as chlorobenzene, dichlorobenzene, xylene trichlorobenzene, dimethyl sulfoxide, N-alkyl pyrrolidones and hexamethylphosphoramide at temperatures of about 100° C. up to the boiling point of the solvent; or at temperatures of about 130 to 240° C. in dispersion systems such as those disclosed in U.S. 3,061,592 and 3,383,352, and by G. B. Gechele and G. F. Martins in J. Applied Polymer Science 9, 2939 (1965).

Adjuvants

The polymerization reaction of the present invention may also be conducted in the presence of various types of adjuvant materials which are normally employed with the types of polymers prepared by the present invention, or the adjuvants may be added to the polymer after it is formed. Such adjuvant materials would include fillers, stabilizers, fibrous reinforcing agents such as asbestos and glass fiber, and pigmenting materials.

The particular polymer being prepared as well as the end use application will dictate the selection and quantity of the adjuvant to be employed therewith since it is the respective adjuvants for such polymers and such applications that are to be employed in the present invention. The adjuvants employed must be physically and chemically compatible with each of the other components of the monomer and polymer based compositions, under the prescribed operating conditions. As such, where they are present during the polymerization reaction, the adjuvants should not contain reactive groups which would interfere with the polymerization reactions, such as active hydrogen containing groups such as carboxyl, amino, mercaptan or hydroxyl groups.

The adjuvants would be used in amounts which would be effective for the intended purpose. Thus, a stabilizer would be used in a stabilizingly effective quantity, and the fillers would be used in effective quantities therefor. For example, if a reinforcing filler were to be used, such filler should be used in such amounts as to provide the desired reinforcing effect.

The polymers made by the process of the present invention may be used for a number of applications which require the use of molded articles prepared from lactam polymers such as fibers, films, engineering structures, coatings and hollow articles such as tubing and solvent tanks.

The following examples are merely illustrative of the present invention and are not intended as a limitation upon the scope thereof.

Example 1

To a clean, dry 25 x 200 mm. test tube held in a 150° C. oil bath were added 56.5 ml. (0.5 mole) of dry ε-caprolactam and 0.24 gm. ($1 \times 10^{-2}$ mole, 2 mole percent, 0.42 gm. of a 57 wt. percent mineral oil dispersion) sodium hydride. A homogeneous solution of sodium ε-caprolactam in ε-caprolactam quickly formed. To this solution was added 0.65 ml. (~0.005 mole, 1.0 mol percent) of thiocaprolactone. The polymerization started immediately and the system became so viscous that it did not flow after three minutes. Crystallization was evident after four minutes and the solid polymer was removed from the bath after five minutes. When the cast polymer had cooled to room temperature, it was ground in a Wiley mill and extracted for 24 hours with boiling methanol. The methanol soluble fraction was 7.2%. The extracted polymer had a reduced viscosity in m-cresol (0.1 wt. percent at 25° C.) of 1.97 dl./gm. It was compression molded at 250° C. to a tough white film which had the following properties: tensile modulus 280,000 p.s.i., tensile strength 9,300 p.s.i., yield elongation 25 percent, elongation at break 50 percent, pendulum impact in ft.-lbs./in.³ 150.

Example 2

The procedure of Example 1 was repeated using 3 mole percent of sodium hydride as the catalyst. The resulting polymerization was somewhat faster. Thus the time for no flow was only 1.5 minutes and the time for crystallization was three minutes. The total time in the oil bath was again five minutes. The methanol soluble fraction was 5.0 percent and the R.V. of the extracted polymer was 1.96 dl./gm. The mechanical properties of a film compression molded from the polymer at 250° C. were as follows: tensile modulus 263,000 p.s.i., tensile strength 8,400 p.s.i., yield elongation 25 percent, elongation at break 120 percent and pendulum impact 106 ft.-lbs./in.³.

Example 3

To illustrate the advantage of using thiocaprolactone in place of its oxygen analog, ε-caprolactone, as the initiator, the procedure of Example 1 was repeated using 0.6 ml. (~1.0 mole percent) of ε-caprolactone as the initiator. This polymerization was much slower. It took 45 minutes to reach a no flow stage. This is clearly too long for a practical casting operation and certainly not economical enough for the preparation of extrusion grade nylon 6.

Example 4

Cast nylon 6 can be very effectively prepared using ε-thiocaprolactone as the initiator. Thus, the procedure of Example 1 was repeated using an initial polymerization temperature of 130° C. The polymer had formed and crystallized after four minutes, but was left in the bath for 20 minutes. The R.V. of the polymer was 1.18 dl./gm. The rigid cylindrical specimen was milled into a rectangular test piece and tested for heat distortion temperature (HDT). A remarkably high value of 177.5° C. at 264 p.s.i. was found. This indicates that the degree of crystallinity is very high for the nylon 6 produced with the thiolactone initiator. By contrast, the HDT of a nylon 6 polymer prepared under similar conditions using a known initiator, toluene di-isocyanate, was only 120° C.

Example 5

The procedure of Example 1 was repeated using freshly distilled thio-γ-butyrolactone as the initiator. The amounts of reactants used were 56.5 grams (0.5 mole) of ε-caprolactam, 0.48 gram of NaH (as 0.84 gram of a 57% by weight dispersion in mineral oil) and 0.5 ml. (about 0.98 mole percent based on the ε-caprolactam) of thio-γ-butyrolactone. The polymerization reaction was conducted at 140° C. The polymerization system had a no flow time of 4.5 minutes and a crystallization time of 4.5 minutes as well. The test tube and its contents were taken out of the bath after 10 minutes and cooled to room temperature. The cast polymer sample was ground up and subjected to a 24 hour methanol extraction and the percent extractables was 2%. The reduced viscosity of the non-extractable fraction of the polymer was 1.58 dl./g. (as a 0.1 g./100 ml. solution in m-cresol at 25° C.).

What is claimed is:

1. An improved process for anionically polymerizing lactam monomer with anionic lactam polymerization catalyst and anionic lactam polymerization initiator which comprises using as said initiator at least one thiolactone compound having the structure

wherein R is a $C_3$ to $C_{20}$ hydrocarbon, oxyhydrocarbon or thiahydrocarbon radical.

2. A process as in claim 10 in which said lactam comprises ε-caprolactam.

3. A process as in claim 10 in which said initiator comprises thiacaprolactone.

4. A process as in claim 10 in which said initiator comprises thiobutyrolactone.

5. A film or fiber forming polymer having the structure

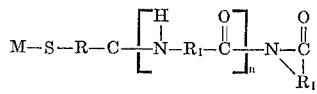

wherein

M is the cation of an anionic lactam polymerization catalyst,

R is that portion of a thiolactone monomer structure lying between the sulfur atom and the carbonyl carbon atom of said thiolactone, $R_1$ is that portion of a lactam monomer structure lying between the nitrogen atom and carbonyl carbon atom of said lactam, and
$n$ is a whole number which is $>1$.

6. A polymer as in claim 5 in which the lactam is ε-caprolactam.

7. A polymer as in claim 6 in which the thiolactone is thiocaprolactone.

8. A polymer as in claim 6 in which the thiolactone is thiobutyrolactone.

9. A process as in claim 1 in which R is a hydrocarbon radical.

10. A process as in claim 9 in which R has the structure

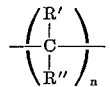

wherein $n$ is a whole number of about 3 to 8, and $R'$ and $R''$ are the same or different and are H or $C_1$ to $C_{20}$ hydrocarbon radicals.

References Cited
UNITED STATES PATENTS

| | | | |
|---|---|---|---|
| 2,276,164 | 3/1942 | Cox et al. | 260—78LX |
| 2,832,757 | 4/1958 | Münch et al. | 260—78L |
| 3,408,335 | 10/1968 | Van Mourik et al. | 260—78L |

WILLIAM H. SHORT, Primary Examiner

L. M. PHYNES, Assistant Examiner

U.S. Cl. X.R.

260—239.3E

UNITED STATES PATENT OFFICE
CERTIFICATE OF CORRECTION

Patent No. 3,597,401  Dated August 3, 1971

Inventor(s) James E. McGrath et al.

It is certified that error appears in the above-identified patent and that said Letters Patent are hereby corrected as shown below:

Column 2, line 21, the formula should appear as shown below:

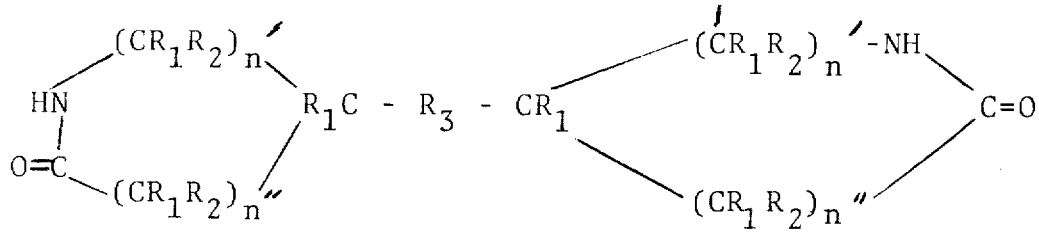

same column 2, line 58, the formula should appear as shown below:

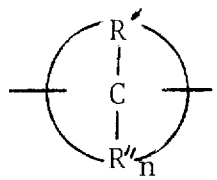

Column 4, line 32, "from" should read -- before --; line 68, after "xylene" insert a comma. Column 6, line 67, that portion of the formula reading "M-S-R-C-" should read -

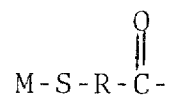

Signed and sealed this 4th day of January 1972.

(SEAL)
Attest:

EDWARD M. FLETCHER, JR.  ROBERT GOTTSCHALK
Attesting Officer        Acting Commissioner of Patents